United States Patent [19]

Nilsson et al.

[11] Patent Number: 5,210,812
[45] Date of Patent: May 11, 1993

[54] OPTICAL FIBER CABLE HAVING SPLICED FIBER BRANCH AND METHOD OF MAKING THE SAME

[75] Inventors: Richard C. Nilsson; Gary W. Edmundson; John C. Nelson, all of Hickory, N.C.

[73] Assignee: Alcatel NA Cable Systems, Inc., Claremont, N.C.

[21] Appl. No.: 895,361

[22] Filed: Jun. 8, 1992

Related U.S. Application Data

[63] Continuation-in-part of Ser. No. 680,991, Apr. 5, 1991, Pat. No. 5,125,060, and Ser. No. 681,156, Apr. 5, 1991, Pat. No. 5,121,458.

[51] Int. Cl.$^5$ ............................................. G02B 6/26
[52] U.S. Cl. .................................................. 385/100
[58] Field of Search ............................... 385/100–104

[56] References Cited

U.S. PATENT DOCUMENTS

| | | | |
|---|---|---|---|
| 4,779,951 | 10/1988 | Bouvard et al. | 385/135 |
| 4,795,230 | 1/1989 | Garcia et al. | 385/135 X |
| 4,799,757 | 1/1989 | Gioetier | 385/135 |
| 4,909,591 | 3/1990 | Capol | 385/100 |
| 5,037,177 | 8/1991 | Brown et al. | 385/100 |
| 5,050,945 | 9/1991 | Sorensen | 385/135 X |
| 5,121,458 | 6/1992 | Nilsson et al. | 385/100 |
| 5,125,060 | 6/1992 | Edmundson | 385/100 |

Primary Examiner—Akm E. Ullah
Attorney, Agent, or Firm—Ware, Fressola, Van Der Sluys & Adolphson

[57] ABSTRACT

A branch point for an optical fiber stub or drop cable from a main distribution cable has an optical fiber cable splice module for protecting the optical fibers and splices from moisture and mechanical damage, providing a strong anchoring point for the optical fiber drop cable, and insuring that the minimum fiber bend radius is not violated. The splice module forms an enclosure for the splices which are held in place mechanically by rows of pins. The stub cable may also be preconnectorized.

25 Claims, 6 Drawing Sheets

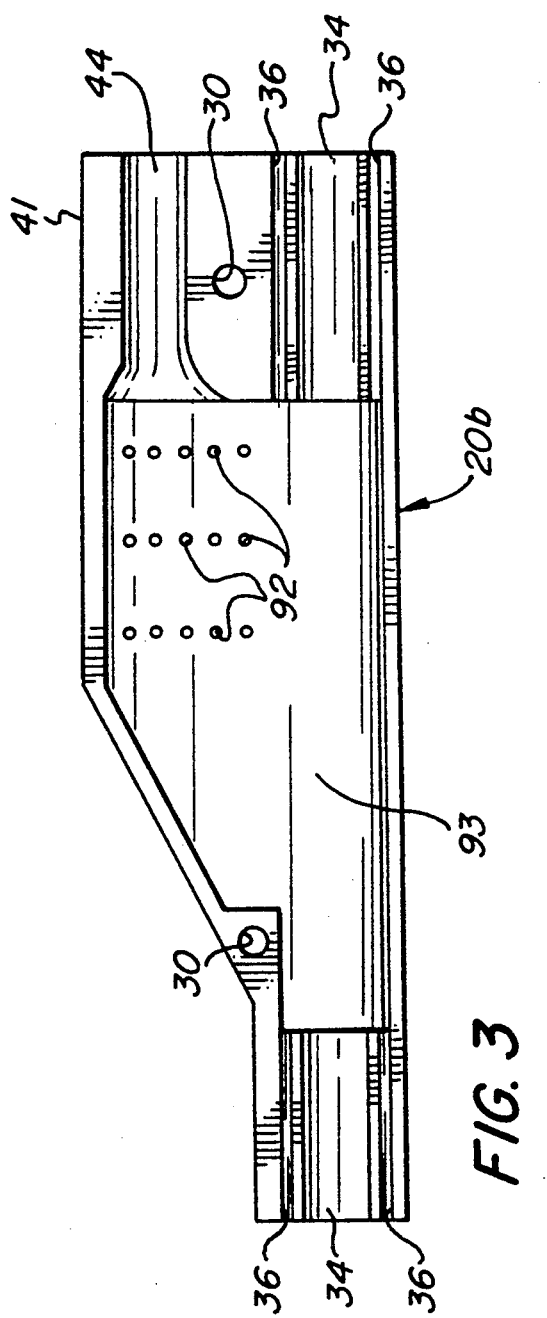
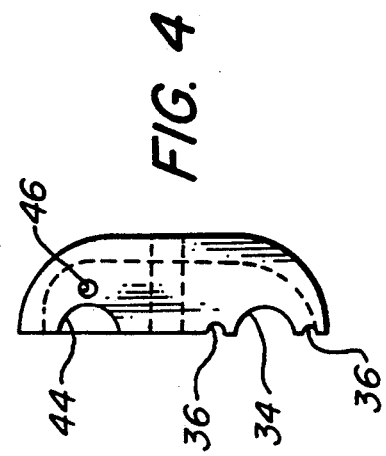

OPTICAL FIBER CABLE HAVING SPLICED FIBER BRANCH AND METHOD OF MAKING THE SAME

RELATION TO PRIOR APPLICATIONS

This is a continuation-in-part of copending applications, Ser. Nos. 07/680,991 (U.S. Pat. No. 5,125,060 issued Jun. 9, 1992) and Ser. No. 07/681,156 (U.S. Pat. No. 5,121,458 issued Jun. 23, 1992), both filed Apr. 5, 1991.

BACKGROUND OF THE INVENTION

1. Field of the Invention

The present invention relates generally to the field of optical fiber cables and more particularly to a spliced optical fiber cable having at least one drop cable extending therefrom.

2. Description of the Prior Art

With the advent of local area networks and the relative broadband capabilities of fiber optic links, it has become commonplace for new communication systems to include fiber optic capabilities. In the use of optical fibers, optical fiber cables are provided for physical protection of the fibers in view of the fragile nature of the glass optical fibers. A main distribution or trunk cable, having a predetermined number of optical fibers, is normally used between two termination points in a communication system. At a point where a connection must be made to local homes or buildings, a splice is made to one or more optical fibers in the distribution cable for connecting a separate smaller sized stub cable, or drop cable. The drop cable is a small flexible cable and is separately routed to the local home or building.

In those systems in which drop cables are required to be spliced to the distribution cable, the required splice must be made on site. This is a very difficult and time-consuming procedure which entails accessing the cable, carefully opening the outer sheath, radial strength yarns, buffer tubes, etc., for accessing the specified optical fibers, splicing the specified optical fibers to the drop cable optical fibers, and sealing the spliced point. Additionally, the technician making the splice may be faced with such adverse working conditions as extreme weather or inconvenient cable placement.

The splice, or branch point of the optical fiber cable must have a number of features. First, it must protect the optical fibers and splices from moisture and mechanical damage and provide an adequately strong anchoring point for the drop cable. It also must insure that the electrical continuity of every metallic cable component is maintained and insure that the minimum optical fiber bend radius is not violated. The branch point should also be reenterable for future optical fiber branching. Thus, to provide a cable with a branch point having these features, a splice closure is used.

Conventional splice closures are normally comprised of metal or plastic and are utilized to enclose the splice thereby protecting the optical fibers and splices from environmental damage. The splice closures provide a strong anchoring point for the drop cables so that if tensile forces are applied to the drop cables, the splices will not be affected. In addition, the splice closure comprises a large cavity therein for providing space for making the splices and for providing slack buffer tube and optical fiber storage space.

Conventional splice closures are either the "butt-end-type" or the "through-put-type" splice closure. Alternatively, the splice closure may be a composite of the two types being adaptable for either splice method.

The butt-end-type splice closure is configured so that the distribution cable enters and exits the splice closure from the same end. In contrast, the through-put-type splice closures are configured so that the distribution cable enters the closure at one end and exits at the other.

In both types of splice closures, however, the manner in which the splice is made is substantially the same. Within the splice closure, the buffer tubes of the distribution cable are accessed and are coiled a number of times so that an adequate amount of optical fiber is available for splicing. A portion of the buffer tube(s) encompassing the specified optical fibers is removed (approximately 24 inches) so that the specified optical fibers may be cut and prepared for splicing with the corresponding drop cable optical fibers. Although not all of the 24 inches of optical fiber is required for the splice, the slack optical fiber is desired so that splices may be redone if necessary or if future optical fiber branching is desired.

In a similar manner, the drop cable (or cables), is prepared for splicing with the specified distribution cable optical fibers. After the splice is made using well-known splicing methods, the splice is held in a splice tray which is mounted within the splice closure cavity. The splice tray prevents a splice from moving about within the closure upon closure movement. The splice closure is assembled by placing the coiled buffer tubes and slack optical fibers within the cavity and enclosing the cavity so that the splice is completely encapsulated.

Because the conventional splice closure must house the slack buffer tubes and optical fibers without violating the minimum bend radius of the optical fibers, the splice closure cavity must be somewhat large to provide adequate space for storage and splicing purposes. Ultimately, this results in a splice closure which is large and bulky, thus making it impractical for all other uses except for on-site optical fiber splicing.

There have been two solutions developed by the assignee of the present invention which pertain to the branching of such cables. In U.S. Pat. No. 5,121,458 issued Jun. 9, 1992 entitled "Preterminated Fiber Optic Cable", a water-resistent closure less than 4 inches in diameter stores and protects the optical fiber and splices which make-up a branch from the distribution or trunk cable to the drop or stub cable(s). The branch can be the origination point for up to six drop cables, and the cable composition can be either all fiber, or composite fiber/metallic conductor. The splice closure can accommodate a relatively large number of fiber optic splices (approximately 12), and can efficiently store around 24 inches of excess fiber. The maximum length of the drop (or stub) cable is essentially unlimited, but typically is less than 100 feet.

Although the assembly described in U.S. Pat. No. 5,121,458 has a great deal of flexibility in regards to number of drops (or stubs), number of spliced fibers, and length of drop cables, the outer diameter of slightly less than 4 inches limits installation in or through typical duct systems which are usually less than 2.5 inches in inner diameter.

In U.S. Pat. No. 5,125,060 issued Jun. 23, 1992 entitled "Fiber Optic Cable Having Spliceless Fiber Branch and Method of Making", a water-resistent branch less than 1¼ inches in diameter acts as a transition from the distributor trunk cable to the drop or stub cable. Instead of the branch containing fiber optic splices, the branched fibers are cut no more than 12 feet upstream, pulled out of the distribution cable, and placed into the protective drop cable structure. Water ingression is prevented by covering the branch with an adhesive lined heat-shrinkable plastic.

The spliceless fiber branch of U.S. Pat. No. 5,125,060 overcomes the diameter limitation found in U.S. Pat. No. 5,121,458, but the maximum length of the drop cables is practically limited to 12 feet. In addition, two trunk cable sheath entries are required to access and branch the optical fiber(s) which increases installation time, cost and the reliability and water ingression risk.

Thus, it would be desirable to develop a solution to the shortcomings found in the prior art.

SUMMARY OF THE INVENTION

The present invention is designed to overcome the above noted limitations that are attendant upon the use of prior art devices and, toward this end, it contemplates the provision of a water-resistent branch to accommodate one or more splices. The splices can be of either the mechanical or fusion variety. This enhancement causes the maximum length of the drop or stub cable to be essentially unlimited. Additionally, the device of the present invention requires only one sheath opening so a small closure diameter is still possible, and a standard drop (or stub) cable can be used.

The invention will be fully understood when reference is made to the following detailed description taken in conjunction with the accompanying drawings.

BRIEF DESCRIPTION OF THE DRAWINGS

FIGS. 3 and 4 are and end elevational views, respectively, of one half of the optical fiber branch module.

DETAILED DESCRIPTION OF THE INVENTION

Figure 1:
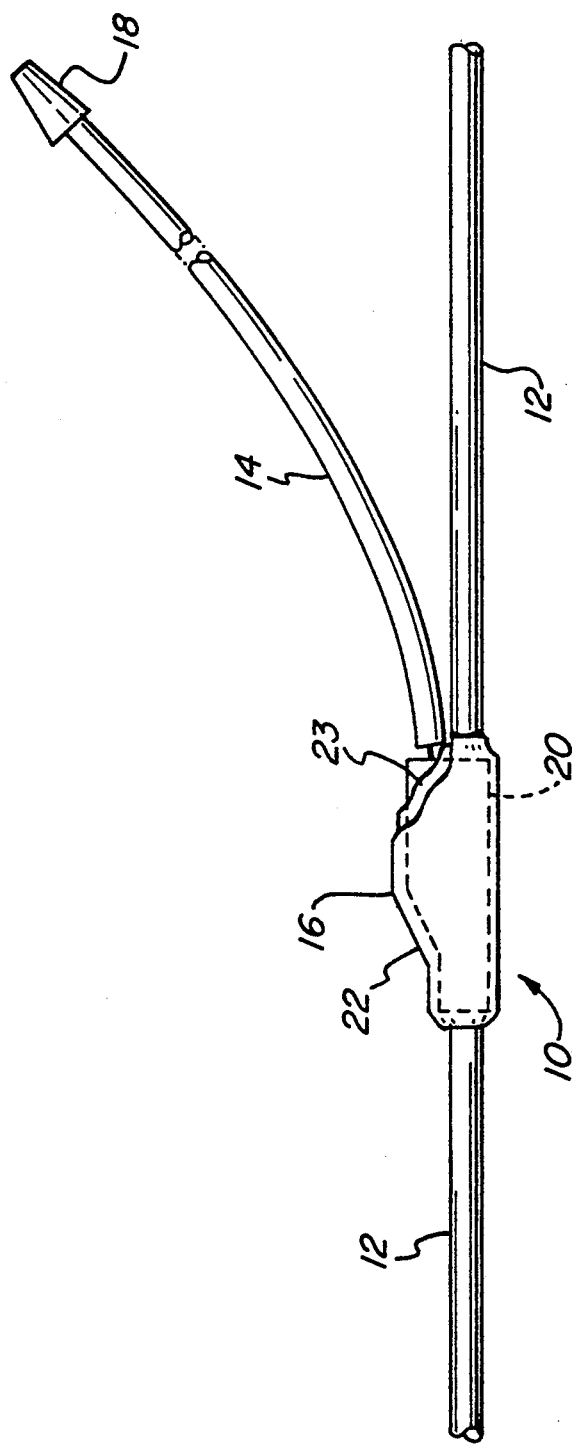
FIG. 1 is a side elevational view partially cutaway showing a spliced optical fiber cable with a branch point of the present invention.

Referring to FIG. 1, there is shown a spliced preterminated optical fiber cable generally indicated by the numeral 10 having a distribution cable 12 and a smaller-sized stub cable 14 extending therefrom at a branch point 16. The distribution cable 12 and the stub cable 14 can have single buffer tube constructions as shown in U.S. Pat. No. 5,029,974 issued Jul. 9, 1991. The distribution cable 12, which can be several thousand feet in length, is utilized to extend between two distant termination points in the communication system. The stub cable 14 is utilized where connections must be made from the distribution cable 12 to a plurality of local termination points, such as homes or buildings. Typically, upon cable deployment, the stub cable 14 is routed from the distribution cable 12 to an aboveground pedestal, an optical network unit (ONU), or the like (not shown). Connections are made at the pedestal from the stub cable 14 directly to the ONU or to a cable or fiber extending from the ONU in the pedestal or at the subscriber.

The stub cable 14, which typically has one or more optical fibers 86 (FIG. 5) and is usually less than 75 feet in length, can be strapped to the distribution cable 12 with cable lashing (not shown) upon manufacture until deployment of the cable 14 is required. Further, the stub cable 14 may be "preconnectorized", or assembled with an appropriate connector 18 at the time of manufacture. This would eliminate the need for splicing.

The branch point 16 is encapsulated by an optical fiber branch module 20. The branch module 20, being shown more clearly in FIG. 2, protects optical fibers 74, 86, 96 (FIG. 5) at the branch point 16 from mechanical damage. The optical fibers 74, 86, 96 (FIG. 5) are further protected from moisture by a branch covering 22. The branch covering 22 is formed of a material generally known as heat-recoverable material which is well known in the art and is formed into heat-recoverable sleeves, tubes and tapes. Disposed between the branch covering 22 and the branch module 20 is a non-adhesive wrap 23 so that the branch module 20 can be re-entered easily after assembly, if necessary.

When making a spliced branch with the distribution cable 12, the specified optical fibers 96 (FIG. 5) must be accessed through the protective elements (i.e., the outer sheath, metallic armored jacket, buffer tube, etc.) of the cable at the branch point 16. To facilitate access to the fibers, optical fiber access tools, such as that illustrated in McCollum et al., U.S. Pat. No. 4,972,581, issued Nov. 27, 1990, and U.S. Ser. No. 07/742,299 filed Aug. 8, 1991 may be used. An optical fiber access tool as described in McCollum et al. is sold by Alcatel Telecommunications Cable, Claremont, N.C., under the designation POCKET SHAVER. The end of the stub cable 14 is also prepared for termination by exposing approximately 3 inches of fibers 86, 2 inches of strength rods 77, and 2 inches of armored covering 81 (if present). The ends of the specified fibers 86 of both cables are then spliced at fiber splice 94 using well known fiber preparation techniques such as fusion (fiber ends melted and "welded" together) or mechanical (fiber ends butted together and permanently held using a mechanical fixturing device). Since there is not a great deal of overlength in the fiber 96 from the distribution cable 12, the splicing operation must not consume or require large amounts (more than 1 or 2 inches) of the fiber 96 in order to allow for possible resplices.

Figure 2:
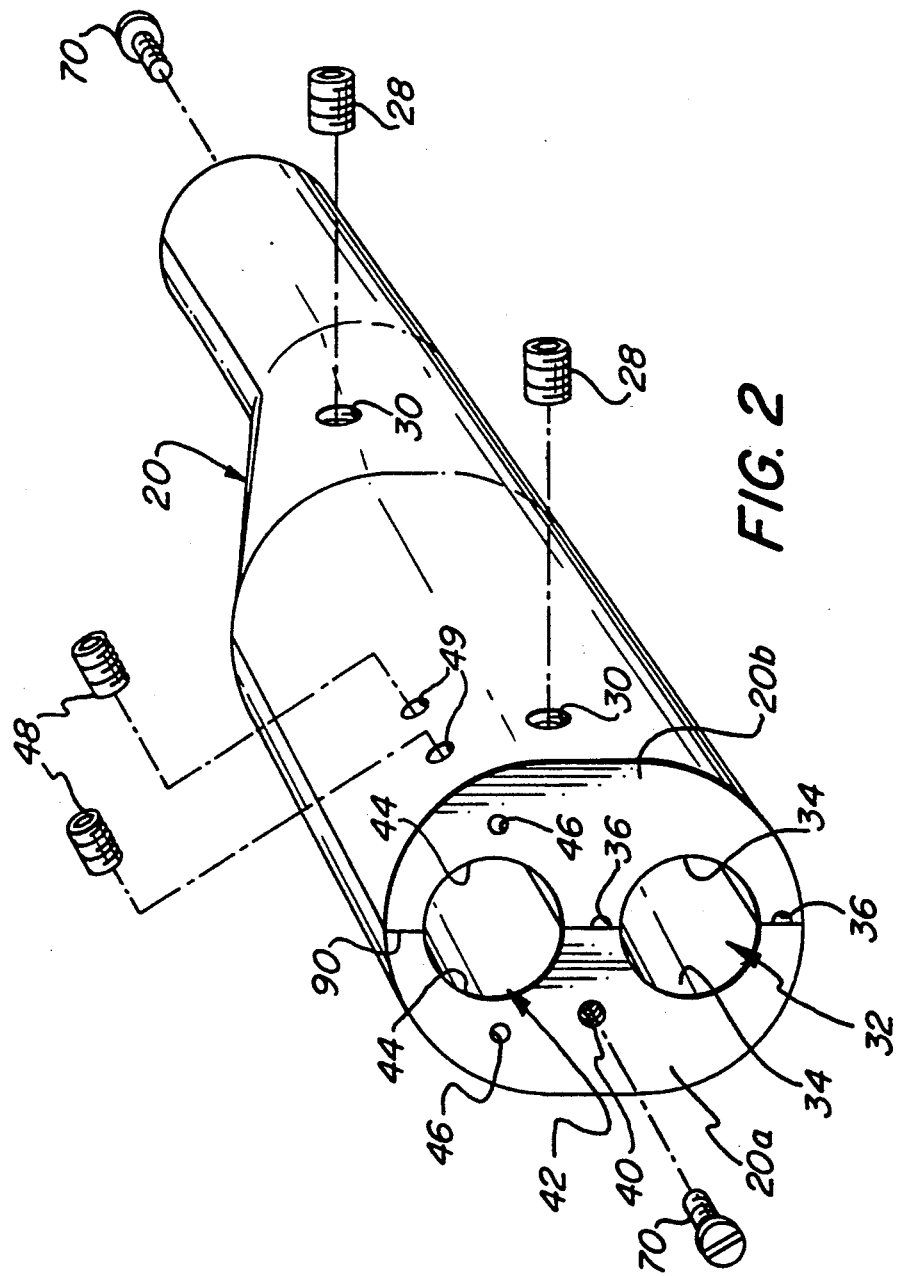
FIG. 2 is a perspective view of the optical fiber branch module of the present invention.

FIGS. 2 through 4 illustrate the optical fiber branch module 20 of the present invention. The branch module is indicated generally by the numeral 20, and is preferably comprised of a metal, such as aluminum, or a metal/plastic combination. The branch module 20 is comprised of a right half 20a and a left half 20b which are held together by two securing screws 28 seated in securing holes 30. The two halves 20a, 20b are separated at location 90 as seen in FIG. 2. When the branch module 20 is assembled, it has a long, thin, somewhat cylindrical shape having a length of approximately 7-15 inches and an outer diameter, at its widest cross-sectional points, of approximately 1.0-2.5 inches.

A distribution cable channel indicated generally by the numeral 32 has a portion at either end of the branch module 20 for receiving the short length of the distribution cable 12 where the branch 16 is made. The distribution cable channel 32 is defined by semi-cylindrically shaped buffer tube channels 34 in each of the halves 20a, 20b dimensioned to receive a length of the buffer tube 56 of the distribution cable 12. As seen in FIGS. 3 and 4, half 20b of the branch module 20 also contains semi-cylindrically shaped strength member channels 36 extending longitudinally along either side of the channel 34. The strength member channels 36 are dimensioned to receive the longitudinally extending strength members 76 of the distribution cable 12. Each channel 34 is dimensioned so that when the buffer tube 56 is disposed in the branch module 20, the channel 34 of each half exerts little to no compressive force on the buffer tube 56. The strength member channels 36, on the other hand, are dimensioned so that when the branch module 20 is assembled, the strength member channels 36 of each half 20a, 20b exert considerable compressive force on the strength members 76 of the distribution cable 12 thereby securing the branch module 20 at the branch point 16.

As will be appreciated by those skilled in the art, each end of the branch module half 20a has a ground strap set screw hole 40 for securing ground straps 66 (FIG. 6) to the module 20 via a screw 70. The ground straps 66 are connected by clamps 68 (or other appropriate means), at their other ends, to the corresponding armored jackets 62, 81 of the distribution cable 12 and the stub cable 14 thereby maintaining continuity of the cable conductive elements.

Alternatively, the armored jackets of the respective cables may be connected via ground straps directly, bypassing the module if, for instance, the module is comprised of plastic. To minimize the outer diameter of the branch point, the ground straps can be disposed in groove(s) (not shown) disposed along the side of the module.

One end 41 of the branch module 20 has a stub cable entrance channel indicated generally by the numeral 42. The stub cable entrance channel 42 is defined by two cylindrically-shaped buffer tube channels 44, one in each of the halves 20a, 20b. A cylindrically-shaped strength member channel 46 is disposed longitudinally in each of the halves 20a, 20b on the side of its stub cable buffer tube channel 44.

The stub cable buffer tube channels 44 are dimensioned so that, during assembly, the buffer tube 72 of the stub cable 14 may be easily placed into the halves 20a, 20b of the branch module 20. Similarly, the strength members channels 46 are dimensioned so that the stub cable strength members 77 may be easily slid into the branch module 20. Set screws 48 are utilized with set screw holes 49 tapped into the halves 20a, 20b to secure the strength members 77 of the stub cable 14 to the module 20.

Each of the halves 20a, 20b of the branch module 20 has a hollow cavity 93. When the halves 20a, 20b are assembled, the cavities 93 form an enclosure which accommodates the fiber splice(s) 94 connecting the appropriate optical fiber(s) 96 of the distribution cable 12 to the fibers 86 of the stub cable 14. The optical fiber splices 94 are securely held using a plurality of rows of splice retaining pins 95 which fit into holes 92 in the hollow cavities 93. The enclosure formed by the hollow cavities 93 is also compatible other well-known methods of securing the optical fibers splices 94. The optical fiber splices 94 can be positioned at either end of the enclosure to allow for resplicing. The initial position of a splice 94 is proposed to be the end closest to the stub cable 14. If resplicing is required, the splice 94 can be repositioned closer to the other end of the enclosure due to the small amount of trunk cable fiber loss caused by having to prepare the fiber for the second splice.

Figure 5:
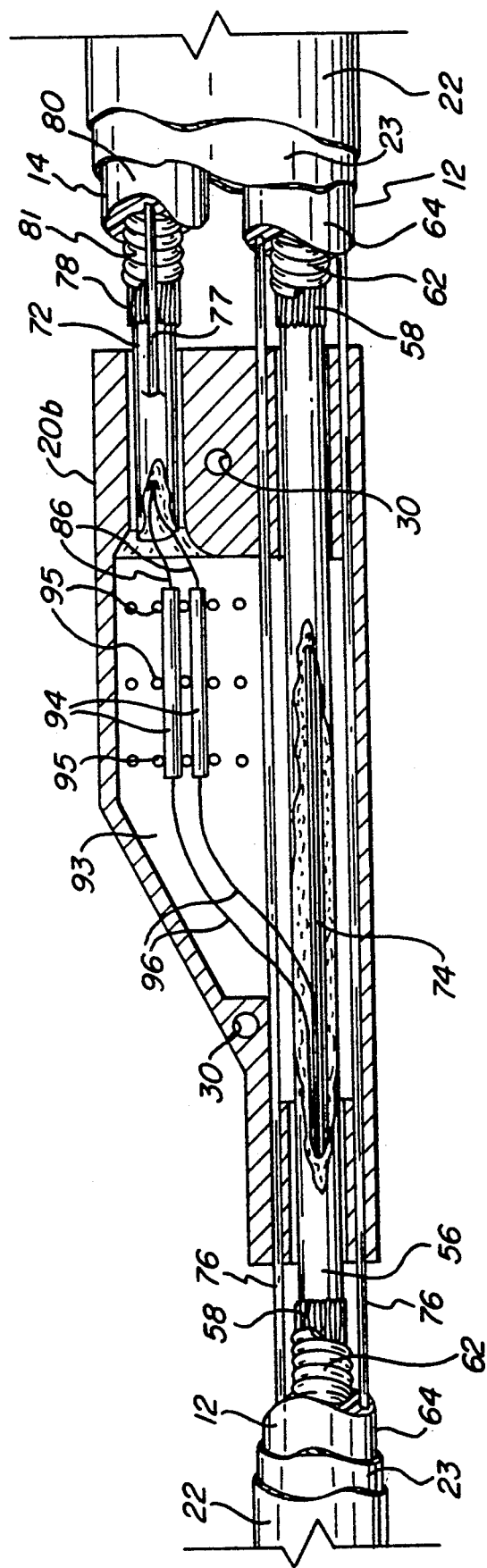
FIG. 5 is a side elevational view of the optical fiber cable branch point with portions broken away and in section to illustrate internal structure.

As can be seen in FIG. 5, the buffer tube 56 of the distribution cable 12 encapsulates the optical fibers 74 which extend the length of the cable 12. The number of optical fibers disposed in the buffer tube 56 may vary depending upon the requirements of the particular cable. The two strength members 76 are disposed longitudinally on the sides of the buffer tube 56 of the distribution cable 12 and extend entirely through the module 20. Reverse helically applied radial strength elements 58 are disposed about the buffer tube 56 for additional cable strength while retaining flexibility. The radial strength elements 56 are preferably of a material such as aramid or fiberglass. An optional inner jacket (not shown) extends about the radial strength yarns 58. Disposed about the inner jacket or radial strength yarns is the optional armored covering 62 for rodent protection. Finally, a plastic outer sheath or jacket 64 provides an environmental/mechanical protective layer and a visually attractive cable.

When used with the branch module 20, portions of the outer sheath 64, armored covering 62, radial strength yarns 58, and inner jacket are removed so that only the buffer tube 56 and the strength members 76 are disposed within the branch module 20. These removed distribution cable components are only removed to the extent necessary for exposing a sufficient length of the buffer tube 56 and strength members 76 to be enclosed within the branch module 20. A portion of the buffer tube 56 is shaved to expose the fibers 74, 96.

The stub cable 14, has a construction similar to that of the distribution cable 12. Also, similar to the distribution cable 12, the outer sheath 80, inner jacket (not shown), armored covering 81 and radial strength yarns 78 of the stub cable 14 must be removed so that the optical fibers 86, buffer tube 72 and strength members 77 are exposed prior to assembly.

To assemble, the exposed lengths of distribution cable buffer tube 56 and strength members 76 are configured so that they are disposed in the channel 34 and the strength member channels 36 of the half 20b. The disposed length of selected distribution cable fibers 96 enter into one side of the optical fiber splice 94 and are connected to the fiber(s) 86 from the stub cable 14. Prior to making the splice 94, the stub cable 14 is held firmly in place by sliding a strength member 71 into the strength member channel 46 and securing it by tightening the appropriate set screws 48 into the holes 49. After the splice(s) 94 are made and the splice(s) positioned in the hollow cavity 93, the other half 20a of the branch module 20 is slid into position with the other strength member 77 in its strength member channel 46 and secured via the securing screws 48. The halves 20a, 20b are secured together using set screw 28.

In a well-known manner, grounding straps 66 (FIG. 6) are connected, at one end, to the respective armored jackets 62, 81 of the distribution and stub cables 12, 14 with appropriate clamps 68 and, at the other end, to the branch module 20a with set screws 70 located in the ground strap set screw holes 40. A non-adhesive wrap 23 is applied, completely enclosing the branch point 16, and a heat-recoverable water-tight wrap 22 is applied thereafter. The heat-recoverable wrap 22 is heat shrunk in a known manner whereby the heat-recoverable and non-adhesive wraps combine to make the branch point 16 substantially water-tight but re-enterable if required.

If the branch module 16 is comprised of plastic, the non-adhesive wrap is not necessary. Although the use of a heat-recoverable wrap is described above, the heat-recoverable encapsulation could also be in the form of hollow tubing, or a preformed piece which provides for the entry and exit of the various cables.

Figure 6:
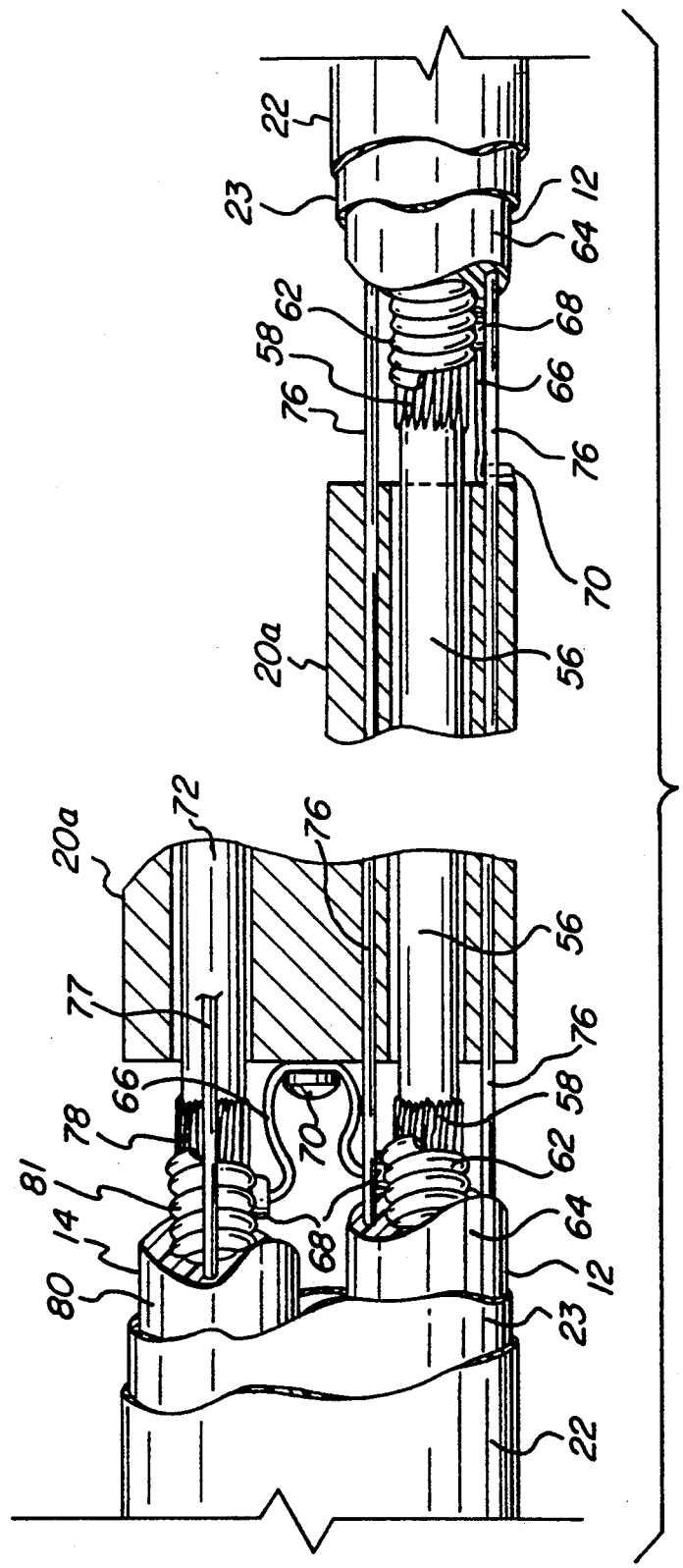
FIG. 6 is another side elevational view of the optical fiber cable branch point with portion broken away and in section to illustrate internal structure.
Figure 7:
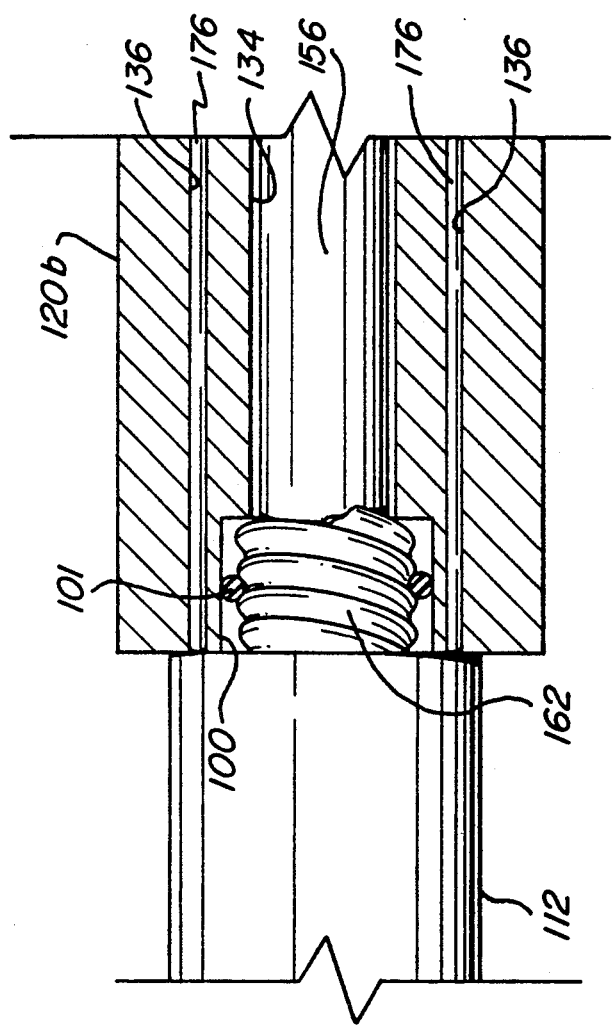
FIG. 7 is a cross-sectional view of a portion of the second embodiment of the branch point which does not require the water sealing layers of the first embodiment.

Referring now to the second embodiment in FIG. 6, if it is desired to eliminate the outer water blocking layers 22, 23 of the first embodiment, the halves of the module can be modified. The outer ends of the channels 134 (only one shown) of halves 120a, 120b (only half 120b shown) are enlarged as shown by numeral 100 to accommodate the armored covering 162 of the distribution cable 112. The remaining portions of the channels 134 are dimensionally sized to accept the buffer tube 156 while the strength members 176 lie in the channels 136 of the half 120b. To prevent the ingress of moisture into the interior of the module, an elastomeric O-ring 101 is secured around the armored covering 162 in intimate contact therewith and also with the enlarged portion 100. A similar arrangement can be made at the entrance of the stub cable to prevent moisture infiltration at that location. Accordingly, the second embodiment can perform its water blocking function without the need for the layers 22, 23 of the first embodiment.

Although the spliced preterminated fiber optic cable is described in terms of a single tube design cable as shown in U.S. Pat. No. 5,029,974, it may be of any other type of optical fiber cable design, i.e., loose tube, tight-buffered, slotted core, etc. Thus, the spliced preterminated optical fiber cable of the present invention can be applicable in the vast majority of optical fiber communication or information systems.

The branch module can be easily modified in design so that it may be used with other types of optical fiber cable designs, i.e., loose tube, tight-buffered, slotted core, composite copper/fiber cables, etc. For example, a modification of the distribution channel 32 so that it is dimensioned for receiving other types of retaining optical fiber retaining means and strength member(s) of the corresponding type of optical fiber cable would allow the module to be adaptable as described. For instance, a slotted core optical fiber cable, by definition, does not comprise buffer tubes encompassing fibers. The slotted core optical fiber cable has a slotted core central strength member with helical or reverse-helical grooves extending therealong for receiving one or more optical fibers. Therefore, to be utilized with the module, the cable would need to be stripped of its protective elements only to the extent that a portion of the slotted core central strength member with fibers disposed in the corresponding slotted core grooves, is disposed within the module.

Thus, it can be seen from the foregoing specification and attached drawings that the present invention provides an effective means for establishing a branch connection in a distribution cable. It should be appreciated that departures can be made by those skilled in the art without departing from the spirit and scope of the invention which is limited only by the following claims.

What is claimed is:

1. An optical fiber cable assembly, comprising:
   a distribution cable having a predetermined length and having first and second ends, said distribution cable further having a branch point being positioned along the length thereof, said distribution cable including at least one optical fiber and an optical fiber retaining means for at least partially retaining said at least one optical fiber;
   a branch cable having a first portion being coincident with said distribution cable at said branch point and a second portion being spaced from said branch point and being continuous with said first portion, said first portion having a branching optical fiber, said branching optical fiber being optically connected to a selected one of said at least one optical fiber through a splice connection; and
   means secured to said distribution cable and to said branch cable for encompassing said branch point, branch point encompassing means includes a branch module having a branch module body defining an enclosure means for receiving and retaining said splice connection.

2. An optical fiber cable assembly as described in claim 1, wherein said branch module has a branch cable passageway and two distribution cable passageways defined therein extending into said enclosure means.

3. An optical fiber cable assembly as described in claim 2, wherein said first portion of said branch cable extends within said branch cable passageway and into said enclosure means.

4. An optical fiber cable assembly as described in claim 2, wherein said distribution cable extends entirely through said branch module body within said distribution cable passageways and said enclosure means.

5. An optical fiber cable assembly as described in claim 2, wherein said branch cable passageway and one of said distribution cable passageways are defined in one end of the branch module and the other of said distribution cable passageways is defined in the other end of the branch module.

6. An optical fiber cable assembly as described in claim 1, wherein said branch module further has means for securing a strength member of said branch cable to said branch module body.

7. An optical fiber cable assembly as described in claim 1, wherein said branch module further has means for securing a strength member of said distribution cable to said branch module body.

8. An optical fiber cable assembly as described in claim 1, wherein said branch point encompassing means further includes conductive means for connecting an armored jacket of said distribution cable to said branch module body and for connecting an armored jacket of said branch cable to said branch module body.

9. An optical fiber cable assembly as described in claim 1, wherein said branch module has a maximum outer diameter of less than two inches.

10. An optical fiber cable assembly as described in claim 1, wherein said branch point encompassing means further includes means for covering said branch module.

11. An optical fiber cable assembly as described in claim 10, wherein said covering means comprises a heat-recoverable wrap.

12. An optical fiber cable assembly as described in claim 11, wherein said covering means further comprises a non-adhesive wrap disposed between said branch module and said heat-recoverable wrap.

13. An optical fiber cab assembly as described in claim 1, wherein said optical fiber retaining means includes a buffer tube encompassing at least a portion of said at least one fiber and further wherein said distribution cable further includes at least one strength member extending longitudinally with said buffer tube.

14. An optical fiber cable assembly as described in claim 13, wherein said branch point encompassing means includes means for securing said at least one strength member to said branch point encompassing means.

15. An optical fiber cable assembly as described in claim 1, wherein said branch cable includes a buffer tube encompassing at least a portion of said branching optical fiber and further wherein said branch cable has at least one strength member extending longitudinally with said branch cable buffer tube.

16. An optical fiber cable assembly as described in claim 15, wherein said branch point encompassing means further includes means for securing said at least one strength member of said branch cable to said branch point encompassing means.

17. A method of making an optical cable assembly comprising the steps of:
provide a distribution cable having a predetermined length and having first and second ends, said distribution cable further having a branch point positioned along the length of said distribution cable, said distribution cable including at least one optical fiber and an optical fiber retaining means for at least partially retaining said at least one optical fiber;
providing a branch cable having a first portion being coincident with said distribution cable at said branch point and having a second portion being spaced from said branch point and being continuous with said first portion, said first portion having a branching optical fiber;
optically connecting said branching optical fiber to a selected one of said at least one optical fiber through a splice connection; and
securing a branch module to said distribution cable and said branch cable for encompassing said branch point, said branch module having a branch module body defining an enclosure means for receiving and retaining said splice connection.

18. A method of making an optical fiber cable assembly as described in claim 17, wherein said branch module has a branch cable passageway and two distribution cable passageways defined therein extending into said enclosure means.

19. A method of making an optical fiber cable assembly as described in claim 17, wherein said first portion of said branch cable extends within said branch cable passageway and into said enclosure means.

20. A method of making an optical fiber cable assembly as described in claim 19, wherein said distribution cable extends entirely through said branch module body within said distribution cable passageways and said enclosure means.

21. A method of making an optical fiber cable assembly as described in claim 19, wherein said branch cable passageway and one of said distribution cable passageways are defined in one end of the branch module and the other of said distribution cable passageways is defined in the other end of the branch module.

22. A method of making an optical fiber cable assembly as described in claim 17, wherein said method further comprises the step of encapsulating said branch module with a heat-recoverable wrap.

23. A method of making an optical fiber cable assembly as described in claim 17, wherein said method further comprises the steps of encapsulating the branch module with a non-adhesive wrap and encapsulating said non-adhesive wrap with a heat-recoverable wrap.

24. A method of making an optical fiber cable assembly as described in claim 17, wherein said method further comprises the step of connecting a grounding strap between conductive portions of said distribution and branch cables and said branch module.

25. A method of making an optic fiber cable assembly as described in claim 17, wherein said branch cable further comprises at least one strength member and said method further comprises the step of securing said at least one strength member to said branch module.

* * * * *

UNITED STATES PATENT AND TRADEMARK OFFICE
CERTIFICATE OF CORRECTION

PATENT NO. : 5,210,812

DATED : May 11, 1993

INVENTOR(S) : Nilsson et al.

It is certified that error appears in the above-identified patent and that said Letters Patent is hereby corrected as shown below:

At column 8, line 13, prior to "branch", please insert --said--.

At column 8, line 63, "cab" should be --cable--.

At column 10, line 7, "17" should be --18--.

At column 10, line 35, "optic" should be --optical--.

Signed and Sealed this

Eighteenth Day of January, 1994

BRUCE LEHMAN

*Attest:*

*Attesting Officer*       *Commissioner of Patents and Trademarks*